No. 766,316. PATENTED AUG. 2, 1904.
N. C. BASSETT.
GEAR WHEEL.
APPLICATION FILED FEB. 24, 1898.
NO MODEL.
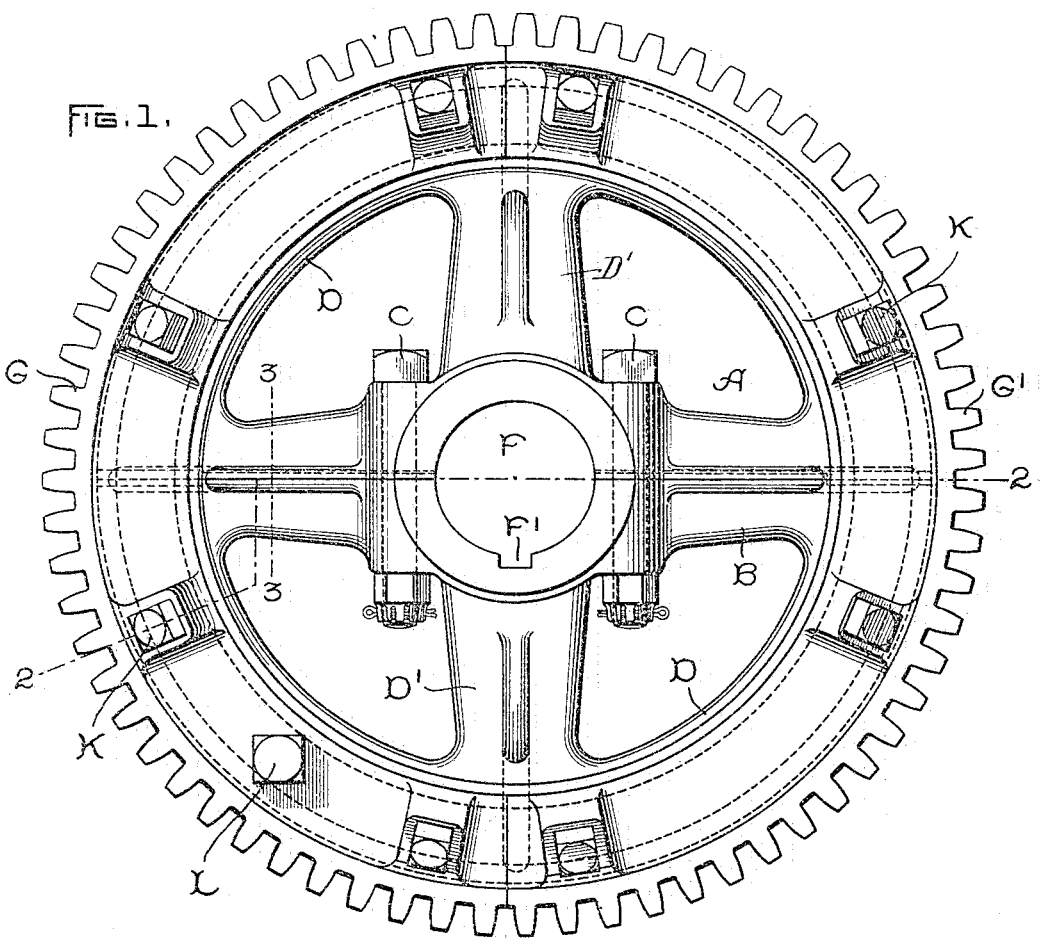
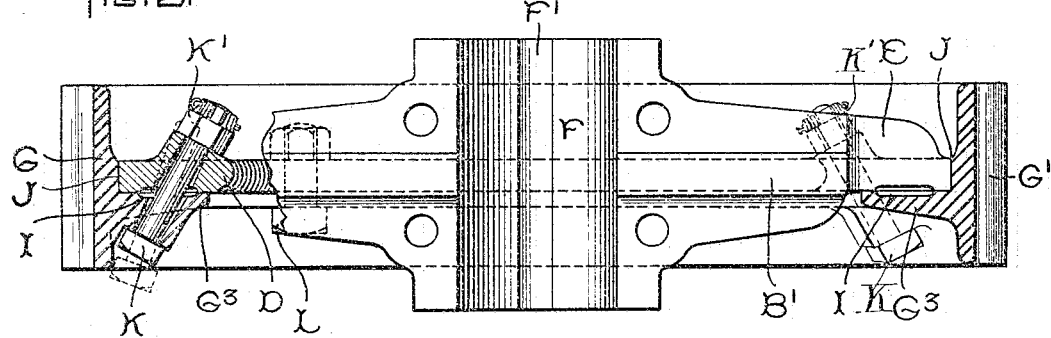
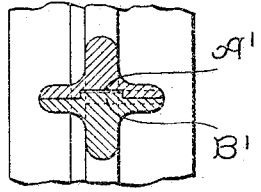
WITNESSES.
E. Williams Jr.
B. B. Hull
INVENTOR.
Norman C. Bassett
by Albert G. Davis
Atty.

No. 766,316. Patented August 2, 1904.

UNITED STATES PATENT OFFICE.

NORMAN C. BASSETT, OF LYNN, MASSACHUSETTS, ASSIGNOR TO THE GENERAL ELECTRIC COMPANY, A CORPORATION OF NEW YORK.

GEAR-WHEEL.

SPECIFICATION forming part of Letters Patent No. 766,316, dated August 2, 1904.

Application filed February 24, 1898. Serial No. 671,415. (No model.)

*To all whom it may concern:*

Be it known that I, NORMAN C. BASSETT, a citizen of the United States, residing at Lynn, county of Essex, State of Massachusetts, have invented certain new and useful Improvements in Gear-Wheels, of which the following is a specification.

My invention relates to that class of gear-wheels or pulleys which are provided with removable rims, and has for its object to improve their construction, particular reference being made to the means employed for securing the rim to its support.

In the accompanying drawings I have shown an embodiment of my invention, in which—

Figure 1 is a side elevation of a gear-wheel. Fig. 2 is a section on line 2 2 of Fig. 1; and Fig. 3 is a cross-section of one of the arms of the support, taken on line 3 3 of Fig. 1.

My invention is shown in connection with a gear-wheel designed for use in electrically-propelled vehicles, for it has its greatest utility in this connection; but it may be applied equally well to removable-rim pulleys. As shown, the hub of the gear is made in two parts, A and B, which are secured together by means of four bolts C. In certain instances it is preferable to cast the support or hub in a single piece and to force it by a hydraulic or other press upon the car-axle or other shaft. When the hub is made in a single piece and employed for carwork, it is mounted on the axle before the wheel is secured in place. A sectional rim D is provided with arms D'. This rim is split on the same line of division as the arms. To prevent lateral displacement of the parts of the hub and also to prevent undue shearing strains on bolts C, a tongue B' is formed on the lower half of the hub, which engages with a corresponding groove A' on the upper half. The meeting surfaces of the parts of the hub are machined, with the exception of the outer ends E, which are made slightly lower to reduce the necessary amount of work thereon. A central opening F is provided in the hub for the reception of the shaft or axle, and a suitable keyway F' is also provided for the reception of the key.

Surrounding the rim D is a detachable sectional toothed rim made in the present instance in two parts G and G'; but any number of sections may be provided, or for certain kinds of work the rim may be made in a single piece. The inside of the toothed rim is provided with a flange $G^3$, which engages with the side face of the hub-rim D. To avoid finishing the entire face of the flange and the corresponding face of the rim D, both are provided with a recess I, as shown in Fig. 2. The periphery of rim D has a machined surface J, which engages with a corresponding circumferential surface on the inner face of the removable toothed rim. It will be seen that the meeting surfaces of the rims are at right angles to each other, one being in a plane parallel to the center line of the hub, the other at right angles thereto. The outer and inner rims are clamped together by means of bolts K, which are inclined at an angle of about thirty degrees to the center line of the rims, so that they extend toward a common center. By this arrangement the outer rim is clamped against the side face of the inner rim or hub and is also drawn inward toward the axis of the hub.

The bolt-holes are somewhat larger than the bolts and are provided with a slight inward taper. The bolts are provided with nuts K' and suitable means for locking them in place. The bolts are prevented from dropping out when the nuts are removed by the heads of the bolts striking the inner surface of the outer rim; but by moving said rim in an axial direction away from the hub-rim D the bolts by reason of their tapering holes will be permitted to take the position shown by the dotted lines, when they will slip past the inner surface of the outer rim and may be removed. This may be done by tilting the bolt in its hole, which, as stated, is larger than the bolt. By placing the bolts at an angle the nuts K' are brought into a position where they are accessible, and any form of wrench may be employed for removing them. This is a highly-desirable feature, and particulaaly in connection with railway-work, where everything is crowded into a limited space.

To prevent the inner and outer rims from shifting circumferentially, a dowel or bolt L is employed, which extends parallel to the center line of the hub and is located in any convenient place. This dowel or bolt may be straight or tapered, as desired, and preferably the holes in the rim are reamed to a standard size.

By the arrangement above described I am enabled to make a gear or pulley having a detachable segmental rim, in which the clamping bolts and holes do not require to be accurately fitted, the dowel or bolt L being the only one in which particular care is exercised. In an ordinary machine-shop it is commercially impracticable to construct a gear or pulley having interchangeable parts in which it is necessary to provide a number of bolt-holes having reamer-fits; but by my construction only a single bolt is so arranged, the clamping of the parts being accomplished by bolts requiring no particular machine-work.

What I claim as new, and desire to secure by Letters Patent of the United States, is—

1. In a wheel, the combination of a hub provided with a rim, a detachable sectional rim, a flange on the sectional rim which engages with a side face on the hub-rim, said sectional rim having a circumferential surface which engages with a corresponding surface on the hub-rim, and means for clamping the sectional rim to the side face of the hub, at the same time drawing it inward toward the center of the hub.

2. In a wheel, the combination of a central body or hub, a removable sectional rim, a flange on the rim engaging with a side face on the central body, said sectional rim having a circumferential surface which is concentric with the axis of the wheel, and a single set of bolts for clamping the sectional rim to the central body and drawing the parts of the rim inward toward the center of the wheel.

3. In a gear-wheel, the combination of a hub provided with a rim, an outer sectional toothed rim, a plurality of loose-fitting bolts which extend toward a common center for clamping the toothed rim to the hub, and a dowel-bolt for preventing circumferential shifting of the rim on the hub.

4. In a split gear-wheel, the combination of a hub made up of two parts, bolts for clamping the parts together, a tongue and groove between the parts for preventing lateral movement, a detachable sectional toothed rim having a flange engaging with a side face of the hub, and a plurality of bolts extending toward the axis of the gear for clamping and at the same time drawing the toothed rim-sections toward the center, and a dowel-bolt for preventing circumferential shifting of the toothed rim.

NORMAN C. BASSETT.

Witnesses:
D. McKILLOP,
HENRY O. WESTENDARP.